Sept. 28, 1954     W. S. SCHAEFER     2,690,493
FLUX SUPPLY SYSTEM AND PROCEDURE Filed May 15, 1951     4 Sheets—Sheet 1

INVENTOR.
Walter S. Schaefer
BY
Robert S. Dunham
ATTORNEY

Sept. 28, 1954 W. S. SCHAEFER 2,690,493
FLUX SUPPLY SYSTEM AND PROCEDURE
Filed May 15, 1951 4 Sheets-Sheet 2
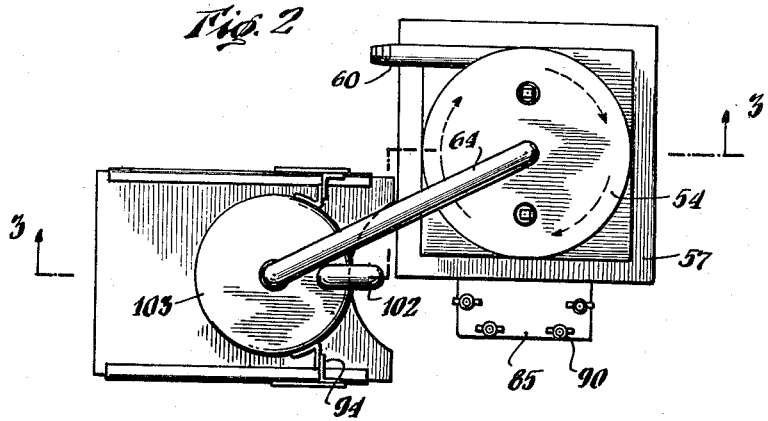
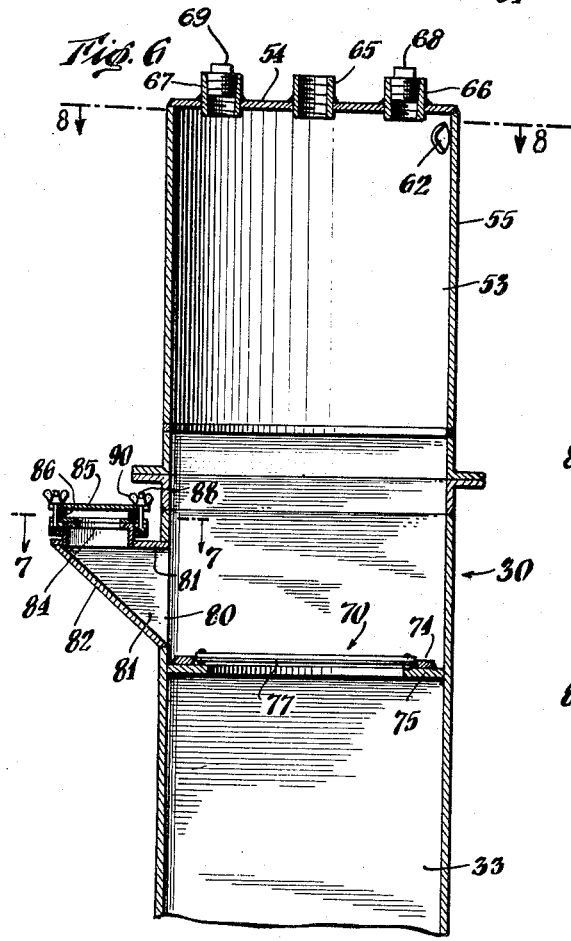
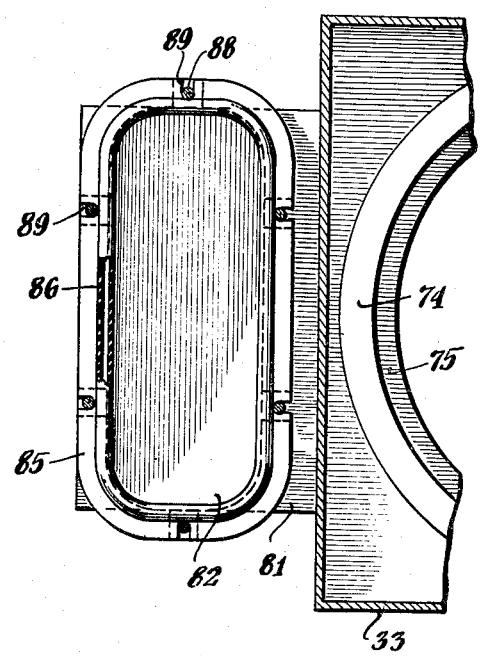
INVENTOR.
Walter S. Schaefer
BY
Robert S. Dunham
ATTORNEY

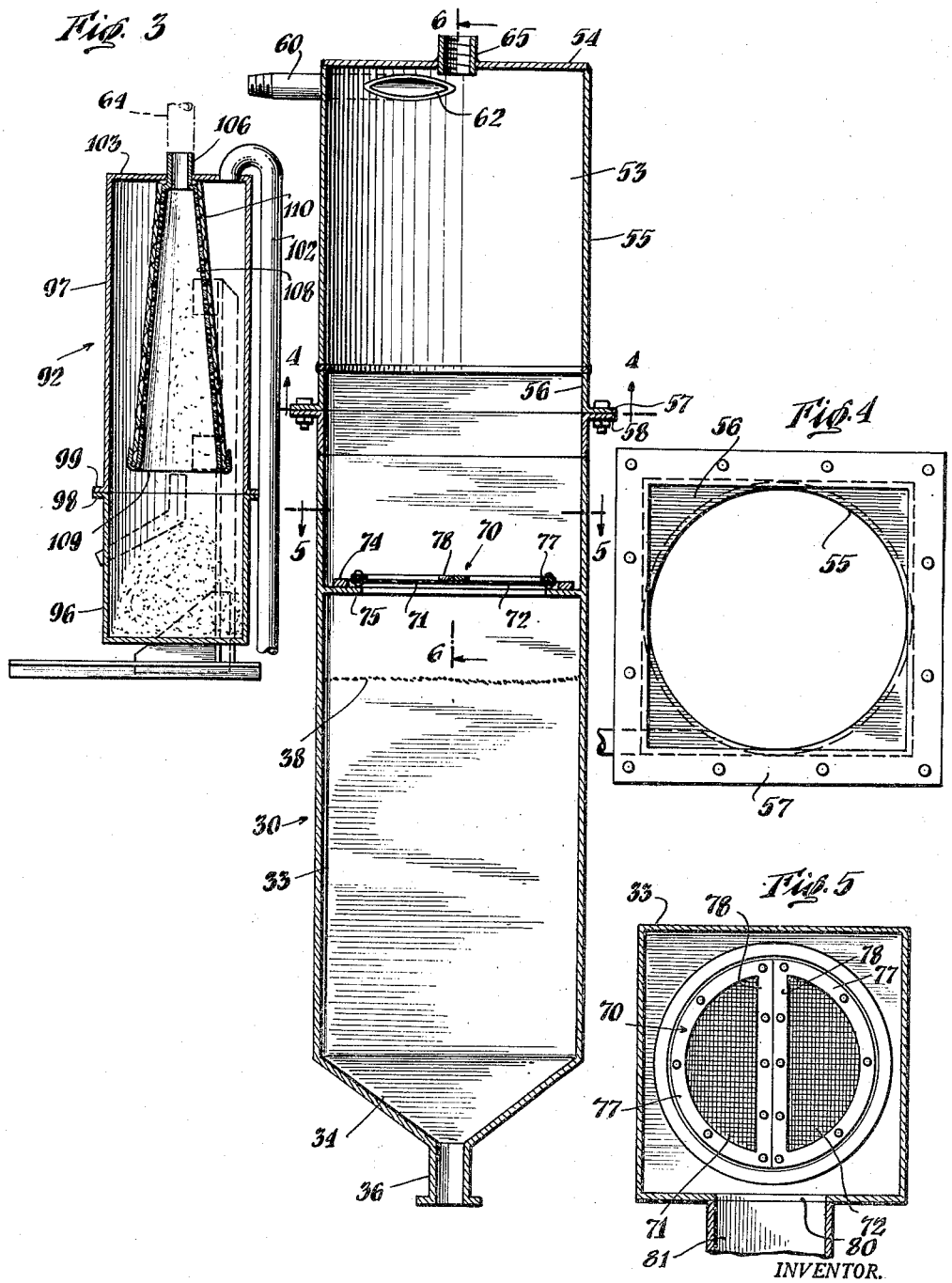

Sept. 28, 1954 W. S. SCHAEFER 2,690,493
FLUX SUPPLY SYSTEM AND PROCEDURE
Filed May 15, 1951 4 Sheets-Sheet 4
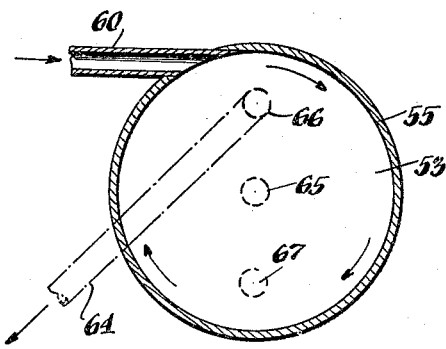
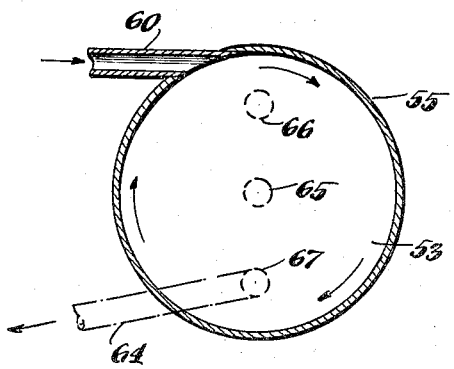
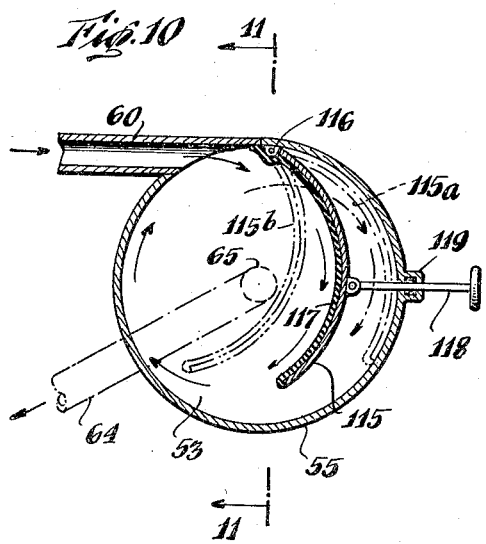
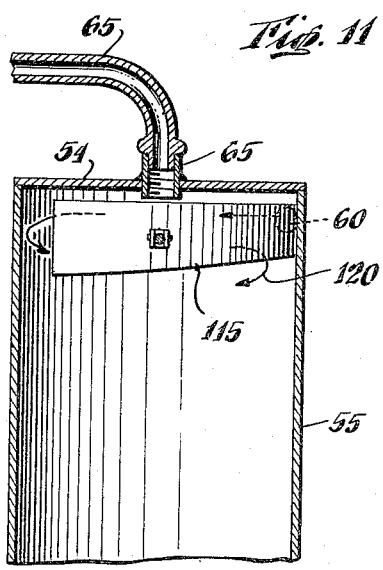
INVENTOR.
*Walter S. Schaefer*
BY
*Robert S. Dunham*
ATTORNEY Patented Sept. 28, 1954

2,690,493

UNITED STATES PATENT OFFICE 2,690,493

FLUX SUPPLY SYSTEM AND PROCEDURE

Walter S. Schaefer, East Gadsden, Ala., assignor to Republic Steel Corporation, Cleveland, Ohio, a corporation of New Jersey Application May 15, 1951, Serial No. 226,469

11 Claims. (Cl. 219—8)

This invention relates to flux feed and recovery systems and procedure for welding apparatus, e. g. for supplying flux material upon the surface of work to be welded, and for recovering excess flux from the vicinity of the finished weld. While the invention is useful under a variety of circumstances, it is peculiarly adapted for electrical arc welding means which is arranged and operated to weld a continuous seam along a predetermined path of the work. A presently important type or example of apparatus to perform such operation involves welding electrodes or rods that function with their working ends submerged in a substantial layer of flux, which must therefore be continuously deposited upon the work along the path which the welding operation is to follow. One kind of flux very suitable for this purpose consists of a relatively fine, granular, solid material, which is essentially free-flowing and which may be discharged by gravity to form a layer or pile extending along the desired seam path.

As stated, in such case the welding arc, struck and maintained between the electrode or electrodes and the work, is submerged in the deposited body of loose flux material. For best operation of such welding procedures, it is at present preferred to apply a large excess of flux, i. e. a great deal more than is actually fused and solidified, or otherwise consumed, in the immediate vicinity of the weld. Hence upon advance of the work beyond the welding station, i. e. by displacement of either relative to the other, a large amount of unused but re-usable flux material remains on the work. A chief object of the present invention is therefore to provide novel and improved apparatus, not only for discharge of flux material to the work, but also for recovery of this excess flux from localities beyond the welding operation.

While such apparatus may be employed in the making of a variety of other types of welded joints, particularly of a continuous character, an important application of the invention, and indeed one for which it has special advantages, is in the manufacture of pipe, notably so-called large diameter pipe (say, 20 inches to 30 inches in diameter) by continuous welding operation. In such manufacture, for example, heavy steel skelp having a thickness or gauge of ⅛ inch to ½ inch is rolled into curved form so as to provide a cylindrical pipe blank having a longtudinal cleft which is constituted by the adjacent edges of the skelp and which must be butt-welded for completion of the pipe. Apparatus to carry out the welding may include, for instance, suitable structure for guiding and advancing a pipe blank along its longitudinal axis past a welding station, with the cleft edges of the blank closed and maintained in a predetermined line, e. g. along the top surface of the pipe. The welding station may comprise one or preferably two welding arc electrodes projecting into proximity with the path of the cleft, for operation in the submerged manner described above. A heavy layer of flux must be continuously deposited on the advancing pipe blank and in bridging relation to the cleft, at a locality rearward of the welding means, i. e. as the pipe surface approaches the electrodes. Considerable quantities of excess flux, suitable for removal and reuse, remain on the welded pipe as it progresses beyond the electrodes.

A further and important object of the invention is therefore to provide new and more efficient flux supply and recovery systems in pipe welding apparatus and the like, adapted for continuous discharge of flux to the weld path and likewise for continuous withdrawal of excess flux from localities beyond the welding operation. Another object is to provide such apparatus wherein the flux is advanced by convenient gravity feed or the like, while withdrawal of excess flux, and return to the supply, is accomplished by suction yet without impediment of useful feed from the supply of flux material.

A further object is to afford improved flux handling means of the character stated, providing the desired feed of the flux and recovery by suction of unused flux, while preventing contamination of the feed supply with oversized pieces, spent clinker, undesirable fines or the like, which may be picked up by the recovery means. A still further object is to provide novel and peculiarly effective structure whereby a continuously operating, vacuum recovery system for large quantities of fine granular material or the like is directly associated with a gravity arrangement for delivery of such material, without mutual interference despite the suction return of the flux to the vessel from which it is simultaneously being discharged. Yet other objects are to afford improved and more satisfactory apparatus of the character stated, having rugged and foolproof structure and permitting reliable and uniform operation over long periods of time, unaffected by magnetic or other conditions which may arise from the circumstances of use.

Separation of fine particles from the recovered flux is very important in many operations. For instance in the described pipe-making equipment, the feed and other rollers continuously tend to grind some of the flux into fines, while the suction return not only picks up these fines and some particles of foreign material, but also has some tendency to produce further small particles by impact and collision of the larger flux grains in the suction conduit. Experience has revealed that these excess fine materials, both of flux and other substances, have an undesirable tendency to cause porosity and other defects in the welding operation, if allowed to return to the vicinity of the weld. Accordingly the present invention affords apparatus and procedure for effectively separating the undesired fines from the returned body of flux, a still further object being to afford means and methods whereby the quantity and size of the flux particles that are separated (i. e. prevented from return to the weld path) can be controlled or adjusted. Thus in some instances it may only be necessary to prevent recirculation of the very finest particles, while in other cases a larger proportion of the returning stream of flux, i. e. a fraction extending to larger sizes of fines, may have to be separated for best results.

To these and other ends, a presently preferred embodiment of the invention is hereinbelow described and shown in the accompanying drawings, by way of example to illustrate the features and principles of improvement.

Referring to the drawings:

Fig. 2 is a plan view, somewhat enlarged, of the supply and suction tank assembly at the upper part of Fig. 1;

Fig. 3 is a vertical section, further enlarged, of the apparatus of Fig. 2, on line 3—3 of the latter;

Figure 1:
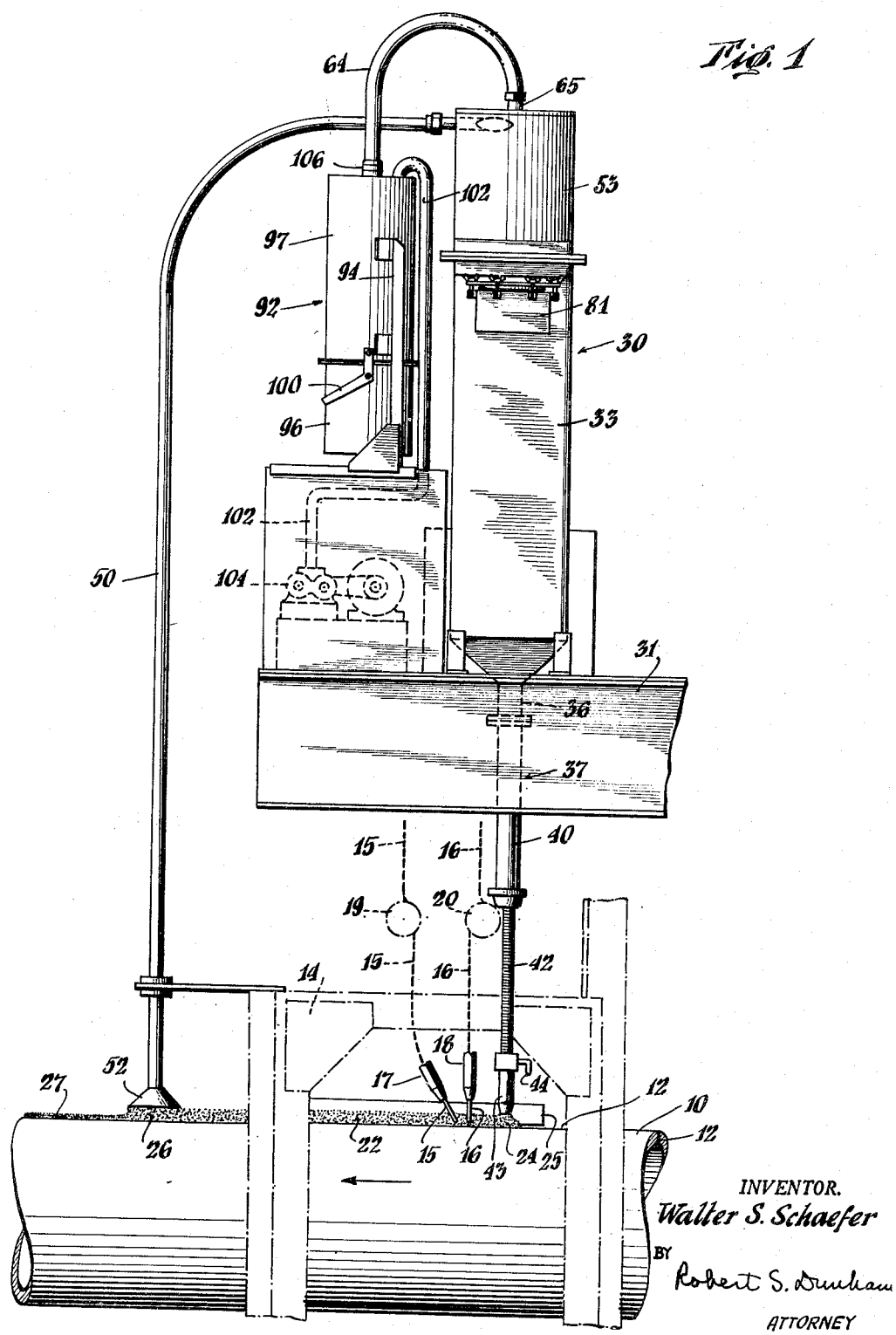
Fig. 1 is a general view in side elevation, showing the apparatus in association with pipe-welding equipment.

Figs. 4 and 5 are respectively horizontal sections on lines 4—4 and 5—5 of Fig. 3;

Fig. 6 is a fragmentary vertical section on line 6—6 of Fig. 3;

Fig. 7 is a greatly enlarged, fragmentary, horizontal section on line 7—7 of Fig. 6;

Figs. 8 and 9 are horizontal sections taken as if on line 8—8 of Fig. 6, but with the orientation of parts as in Fig. 2, and respectively showing other selected connections of the suction pipe, for different control of fines removal;

Fig. 10 is a section corresponding to Figs. 8 and 9 but showing a modified arrangement for adjusting the control of fines separation; and Fig. 11 is a vertical section on line 11—11 of Fig. 10, but with certain internal structure in elevation.

As explained above, the apparatus is shown in embodiment with pipe-manufacturing equipment wherein a tubular pipe blank indicated at 10 in Fig. 1, is advanced axially in the direction of the arrow, i. e. from right to left in this view, for welding a seam along a longitudinal cleft 12 at its uppermost surface. In Fig. 1, the pipe blank 10 may be understood to be advancing through a chuck device represented by its frame structure 14, which by virtue of a multiplicity of rollers or the like (not shown) holds the moving pipe very firmly, with the edges of the cleft closed. It will also be understood that the pipe blank is guided and driven toward and through the chuck by other suitable roller means, likewise not shown.

While any of various arc welding instrumentalities, employing one or more arc electrodes, may be employed for the welding operation on the passing blank, the illustrated apparatus includes a pair of electrodes or rods designated 15, 16 and each consisting of a welding wire or rod fed through and held by a nozzle 17 or 18. The welding wires 15, 16 may be continuously advanced from a remote supply, by suitable means as indicated at 19, 20, and under suitable control. It will be understood that the feeding, controlling and energizing means for the welding wire or rod electrodes constitute no part of the present invention and may be of any conventional type, but it will be noted that the wires 15, 16 travel vertically down toward the pipe blank 10 from above. The leading ends of the wires are maintained just above the weld locality, so that an electric arc is struck and maintained between each of them and the cleft edges to accomplish the intended weld by the cooperative function of the two arcs and the continuous deposition of the metal of the wires 15, 16.

As also indicated above, it is desirable to deposit a relatively thick layer of flux material 22, e. g. 1 or 2 inches deep, in bridging relation to the cleft and thus along the path to be welded on the work, so that the electrodes plow through the flux as the pipe blank carries the latter along and so that the arcs are in effect submerged beneath the flux. One example of a suitable flux is a finely granular material, having a particle size for the most part larger than about 0.002 inch, but with few if any particles having a greater dimension than about $\frac{1}{16}$ of an inch, such material being a free-flowing solid and consisting of comminuted particles of a fused or otherwise agglomerated mixture of fluxing constituents, e. g. such as manganese oxides, silica, iron oxide, lime, magnesia and alumina.

In the apparatus shown, such flux is continuously deposited over the cleft at a locality 24 close to the rear of the electrodes 15, 16 (i. e. ahead of them in the course of pipe travel) to provide the layer 22. Guard or shield means, for example as described and claimed in the copending application of Frederic M. Darner and Walter J. Caine, Serial No. 99,101, filed June 14, 1949, may be provided along each side of the desired path of the flux layer through the chuck, such device on one side being represented by the plate 25 in Fig. 1. By the welding operation a central portion of the flux heap is melted and in effect consumed; the material emerging at the left of the arcs and thus reaching a locality 26 beyond the chuck 14, therefore comprises a central, fused or clinker-like core 27 immediately above the weld and a surrounding and considerably larger mass of unused, granular flux.

The flux supply and recovery system embodies an upright supply tank generally designated 30 and mounted on suitable supporting structure 31 above the welding apparatus. The tank 30 has a lower or flux holding portion 33, conveniently rectangular in plan, and closed at its bottom by a hopper section 34 of inverted pyramidal shape. A discharge passage or fitting 36 opens through the bottom of the hopper 34 and communicates with a conduit arrangement generally designated 37 which opens downwardly at a point just above the locality 24 in the welding apparatus. Thus angular flux stored in the supply section 33, e. g. to a level indicated by dotted line 38, may feed continuously by gravity through the conduit 37 for continuous deposit on the pipe blank.

While other flux advancing or delivering means may be employed in some cases, a convenient structure for the conduit 37 includes a rigid pipe section 40 extending from the fitting 36 for a considerable distance toward the weld path, e. g. at least about one-third of the distance and preferably somewhat more, the pipe 40 being coupled to a flexible conduit section 42 which terminates in a nozzle portion 43 having a suitable gate valve or like device 44 for controlling the rate of flux delivery. It has been discovered that particularly advantageous results are achieved by making the conduit assembly 37 substantially entirely of non-magnetic material. For example, the pipe section 40 may be made of brass or other durable, substantially non-magnetic substance (such as glass or stainless steel), while the flexible section 42, which permits accurate alignment of the flux delivery with the weld path, may comprise a length of heavy rubber or fabric hose reinforced with stiff coiled wire or the like, embedded in and preferably internally covered by the flexible body of the hose. If desired, the nozzle structure may similarly be made of brass, bronze or other non-magnetic substance.

It has been found that since the nearby electrode wires 15, 16 may carry very substantial currents, e. g. of the order of 500 to 1000 amperes apiece, magnetic materials such as iron or ordinary steel if used for the conduit structure 37 become highly magnetized from the field of the arc current. When a flux of the type described is employed, i. e. containing a considerable proportion of magnetic iron oxide, the resulting magnetization of the conduit attracts and retains the flux particles internally, to the extent of tending to choke off the feed of flux. However, by employing non-magnetic material in this portion of the flux handling system, such difficulty is entirely obviated and the flux flows down freely. While the wire reinforcement of the hose section 32 may be non-magnetic, it appears that the use of steel for the relatively minor part of the conduit wall which is constituted by the wire produces so little magnetic effect as not to interfere with proper feed of flux; the conduit structure 37 thus remains essentially non-magnetic in character.

For gravity feed of the flux the conduit line 37 is preferably vertical throughout or at least very nearly so, to cooperate in avoiding various retarding effects, i. e. not only due to the high angle of repose of the specific flux mentioned above, but also due to the vacuum maintained at an upper part of the tank 30 as explained below.

For recovery of unused, comminuted flux material from the surface of the work beyond the weld locality, a long conduit 50, which may conveniently constitute similar, wire-reinforced hose, extends from an uppermost part of the tank 30 to the locality 26 in the path of pipe travel, the conduit 50 there terminating in a flaring mouth member 52 which opens just above the top of the flux layer 22. The hose 50 communicates with the upper portion 53 of the supply tank 30. The upper tank portion 53 comprises a vertically cylindrical structure which has a flat top 54 and a cylindrical side wall 55, and is mounted to the upper, open end of the lower section 33 by an adapter collar 56 having a bottom flange 57 removably bolted to a top flange 58 on the section 33. As shown in Figs. 1, 2 and 3, the hose 50 communicates with the tank section 53 through a short length of pipe 60 which tangentially intersects the side wall 55 at a locality close to the top 54, thus providing an oval opening 62 in the tank wall and affording entry of an air-borne stream of particles from the hose 50 in tangential relation to the interior of the tank 53.

For application of suction to the conduit structure 50, so that the loose flux may be removed from the locality 26 in a continuous and automatic manner, a vacuum pipe 64 opens through a fitting 65 at the center of the tank cover 54. As shown in Fig. 2 the suction pipe 64 is connected to the central fitting 65 of a plurality of such fittings arranged in a row across the top 54 of the tank, such row conveniently extending diametrically from a region adjacent the inlet opening 62 of the flux pipe 60. For example, in the apparatus shown, three such fittings are indicated at 65, 66 and 67, the fitting 65 being cenrally located in the row. It will be understood that fittings not used in a desired condition of adjustment, such as the fittings 66 and 67, are appropriately closed with removable plugs as indicated at 68, 69.

Assuming that suction is applied to the pipe 64, so as to cause a substantial flow of air through it at a considerable rate, corresponding suction and upward flow of air will be developed in the hose 50, thus drawing up all of the loose flux material that passes beneath the mouth 52. Carried in the stream of air thus entering the tank through the opening 62, the flux particles tend to whirl about in the tank section 53, generally in the path of the dotted arrows in Fig. 2. In such fashion, opportunity is afforded for all but the finest of the particles to settle through the tank section 53; only the fines are carried on with the air through the pipe 64. In other words, by permitting the velocity of the incoming air to be substantially expended in paths along the inside of the cylindrical wall 54 and by thus in effect causing the air to assume a reduced velocity in central regions of the vessel before it is accelerated at the opening 65, the tank section 53 permits effective separation of the useful and by far the major part of the recovered flux, which thus settles downwardly into the head of the lower section 33.

At a suitable locality near its upper end, but preferably spaced somewhat below the flange 58 as shown, the tank section 33 has a transverse, partitioning screen generally designated 70, which serves the primary function of separating inordinately large pieces, lumps of fused clinker or spent flux, or the like, from the material that is dropped downward toward the section 33, e. g. from the recovered flux particles that fall through the upper section 53. For rigidity and convenience of removal, the screen 70 may consist of two, complementary, semi-circular sections 71, 72 (Figs. 3, 5 and 6) seated within an annular guard strip 74 and upon an internal flange 75 which carries the guard strip and is welded to the inside of the tank section 33. The flange 75 thus underlies and supports the semi-circular frame pieces 77 of the screen sections 71, 72. Each of the latter also has a straight side frame element 78, abutting the common diameter of the sections. The screen portion of each may be wire cloth of a size, say 0.171 inch opening mesh, suitable for the desired purpose.

Means are also provided for introduction of fresh flux material, both at the outset of operations and also from time to time as necessary to make up for material consumed and thus lost from the re-cycling system. A presently preferred arrangement, shown in Figs. 1, 2, 6 and 7, includes a lateral opening 80 in a side wall of the tank portion 33 just above the screen 70.

Fitted to this opening is a hopper-like feed box 81 having a wall 82 that slopes downwardly toward the lower edge of the opening 80. The box 81 has a horizontal top opening 84 closed by a removable cover 85. The cover 85 is held in place against a resilient gasket 86 around the opening, by pivoted bolts 88 which may be swung into notches 89 in the periphery of the cover and there tightened in place by wing nuts 90, so as to provide a sealed but readily removable closure.

It will be noted that the opening 80 is of substantial width and also considerable height relative to the dimensions of the tank structure, and the horizontal opening 84 is likewise of ample size. Not only is the introduction of flux material thereby facilitated, but means are thus afforded for observation of, and access to, the screen structure 70. By opening the cover 85 any undue accumulation of large pieces on the screens can be seen, and removed either manually or by the use of suitable implements inserted through the openings 84, 80. The operator can also reach in and remove the separate screen sections 71, 72 through the feed box, whenever necessary, as to clean or repair them, or to facilitate introduction of new flux into the tank section 33.

The structure just described is of special advantage in permitting continuity of operation, without interruption for cleaning or charging of the flux feed system. That is to say, with the arrangement of the feed opening and its accessible screen at an intermediate locality of the tank, in combination with the lower tank structure 33 of sufficient height to maintain a constant gravity discharge of flux without interference by the suction at the head of the column, the necessary supplemental charging of the tank with flux and the removal of over-sized pieces that might clog the flux discharge nozzle or impair the welding operation, can be jointly achieved in an essentially single step. To even greater advantage, such combined charging and cleaning operation can be performed without interrupting the continuous welding operation at the electrodes 15, 16 and without in any way disturbing the suction piping or connections leading to and from the head portion 33 of the complete tank.

As stated, the operator need merely open the cover 85 for a brief interval, whereupon he removes the undesirably large pieces collected on the screens 71, 72 and then immediately introduces the additional amount of flux needed to maintain a full supply in the system, some flux being necessarily lost all the time by fusion into a hard core immediately over the weld, and also by the separation of undesirable fines. During this simple, single operation, the opening of the cover breaks the vacuum, but there is no substantial, adverse effect. Over a short distance of the weld path at 26 (Fig. 1) some flux is then left uncollected, but the relative amount is very small and if necessary may be recovered by hand. The actual welding operation need not be interrupted at all, the supply of flux in the lower part of the tank 33, even when partially depleted, being sufficient to assure full continuation of gravity feed through the nozzle 43 during the time necessary for cleaning and charging. Thus the welding operation may run continuously, even for days in succession, without any shut-down whatever, yet the cleaning and charging operation can be effected many times throughout the period, indeed so that further flux totaling many times the capacity of the tank and recirculating system can be progressively added without stopping the weld.

The apparatus also includes cooperatively effective vacuum means connected to the pipe 64 and embodied in a separate suction tank 92 (Figs. 1, 2 and 3). The tank 92 consists of an upright cylindrical vessel, supported by columns 94 which extend vertically along opposite sides and which are secured to its upper portion as shown. The lowermost section of the tank comprises a removable vessel or bucket 96 adjoining the upper section 97 by means of external flanges 98, 99 on the respective sections, the lower section being removably held in place by a pair of arms or brackets 100 which are disposed on opposite sides of the device and are separately bolted to the upper and lower sections. As will be apparent from Fig. 3, the lower bucket section 96 thus serves to collect very fine material carried over by the suction from the main tank 30, for appropriate disposition of such material from time to time.

Suction is applied to the interior of the tank 92 through a pipe 102 that opens into one side of the top 103 of the tank, and extends to a suitable suction or vacuum pump, for example of the motor-driven, impeller type, indicated at 104 in Fig. 1. It will be understood that the pump 104, which may be of conventional construction, produces a sufficient flow of air downwardly through the pipe 102 to create and maintain the desired vacuum or suction conditions in the described system with which it thus communicates.

The suction pipe or hose 64 to the main tank 30 conveniently opens into the top 103 of the supplemental tank 92 through centrally disposed fitting 106, the apparatus including a foraminous shield or screen which extends as a partition between the connecting passage 106 and the opening of the vacuum or suction line 102, to a locality remote from both. Such partitioning means may comprise, for example, a perforated cone-like or frusto-conical member 108 of rigid structure (i. e. metal) which has its upper, open end secured around the fitting 106 and extends downwardly, in flaring relation, to an open lower end 109 just above the bucket portion 96. A corresponding, conical bag 110 or like tubular member of porous material, e. g. cloth, is fitted over the outer surface of the perforate support 108, and is preferably fastened to the latter at the top and bottom as shown, so as to lie close to its outer surface.

As illustrated, the openings of the metal cone 108 are relatively large so that it serves simply to support the fabric sleeve 110, which performs the desired filtering or screening function. That is to say, as the stream of air and fine flux particles is drawn in through the pipe 64, the air passes freely through the fabric 110 to the suction pipe 102, for maintenance of effective suction and continuity of air flow in the system, while the flux particles, screened out by the cone-shaped partition 108—110, fall through the latter into the relatively quiescent atmosphere of the lower or bucket section 96. The fines thus collect in the bottom of the section 96, for removal as necessary from time to time.

The operation of the apparatus will now be readily apparent from the foregoing description. Assuming that the lower tank section 33 has been filled with the granular flux material to an appropriate level and that the leading edge of a pipe blank 10 has reached the locality 24, the valve or gate 44 is opened to provide a continuous, gravity feed of flux onto the surface of the blank through the conduit structure 37 from the tank hopper 34. The desired layer or deep band of loose flux 22 is thus continuously deposited on the passing pipe, for cooperative effect in the welding operation by the electrodes 15, 16. The vacuum system also having been set in operation by starting the pump 104 (which runs continuously thereafter), excess loose flux is picked up by the mouth 52 of the conduit 50, and is carried by the latter to the head of the upper tank section 53, i. e. under the influence of suction transmitted through the pipe 64.

By the described whirling action in the cylindrical tank 53, nearly all of the recovered flux particles fall to and through the screen 70, providing continuous re-filling, in substantial measure, of the lower tank portion 33. Oversize pieces are collected on the screen, while fines and dust are carried off and collected in the supplemental tank 92 as explained above, where they collect in its bucket section 95. The operation is entirely continuous and automatic; the operator need merely preserve a desired adjustment of the gate valve 44, to maintain a sufficient deposition of loose flux on the upper pipe surface. From time to time the screen 70 may be cleaned off, and additional flux introduced through the feed structure 81. Adapted to operate continuously over long periods of time, the apparatus has been found rugged and reliable in all respects.

By virtue of the arrangement and considerable vertical extent of the tank structure 30, and especially by the operation of the tall separator section 53 and by the cooperating height or depth of the storage section 33, the suction conditions maintained at the head of the column do not impede the desired gravity feed of flux through the conduit 37. In the first place, the tank section 33 is of substantial vertical dimension, permitting maintenance of a relatively tall column of flux therein, and thus sufficient to afford ample head (of flux material) on the flux particles in the hopper section 34, so that their downward flow by gravity is not sensibly impaired by any upward force due to the suction or other conditions existing at the top of the tank 30. The relatively considerable mass of flux in the lower part 33 of the tank also effectively closes such part or at least provides an extremely high resistance against air flow upwards from the conduit 37; although the air pressure in the head of the tank may be substantially below atmospheric, a rise to atmospheric value is achieved between the top of the flux column and the hopper 34, without causing any appreciable upward stream of air in the conduit 37. Furthermore, the structure of the tank 53 and the relation of the inlet and outlet means 60, 65, localize air flow and turbulence at a region remote from the flux body in the lower section 33, so that the air just above the flux surface 38 is essentially quiescent; there is thus preferably no agitation in the upper part of the stored flux, nor among the falling flux particles below the screen 70. Finally, as stated above, the structure allows maintenance of a sufficient weight of flux above the delivery region 34 to prevent any impediment to the gravity feed, by the upward force of suction.

While the proportions and dimensions of the apparatus may be widely varied to suit different circumstances and requirements of use without departing from the principles herein explained, one instance of a peculiarly effective structure is set forth by way of example. Such apparatus was designed to feed finely granular flux, of the character mentioned above, at a rate of about five pounds per minute through the nozzle 43, the feed being also adjustable to values considerably above and below such rate. The flux had an actual density (of the particles themselves) of about 216 pounds per cubic foot, and an apparent density, i. e. when packed in a mass or column, of about 104 pounds per cubic foot.

In the specific device mentioned, the inside section of the tank portion 33 was a square having a side of about 18 inches. The section 33 had a height, from the top of the hopper portion 34 to the flange section 58, of a little over 5 feet, while the cylindrical tank section 53 had an inside diameter of about 18 inches and a height of about 2 feet. The screen 70 was located about 1 foot below the flanges 58, 57. In the supplemental tank 92, the cone-shaped, foraminous partition 108, 110 was about 2 feet tall, flaring to a lower opening 109 having a diameter of about 8 inches. With the pump 104 pulling air at a rate of about 130 cubic feet per minute, in the pipe 102 and producing a corresponding suction in the conduit 50, highly satisfactory operation was achieved, in the manner stated above. The apparatus provided the desired continuous deposition of flux at the locality 24 (as a constant, uniform stream from the spout 43), while effectively removing all of the loose particles at the region 26, and discharging all but the finest and thus useless fraction of them into the tank section 33. Both the feed and recovery branches of system were remarkably free of clogging or other irregularity of operation.

As indicated above, the disclosed apparatus not only affords separation of undesirable fine particles but also affords a way in which the size or amount of the diverted fines may be controlled. Referring, for example, to Figs. 8 and 9 in comparison with the connection of the suction pipe 64 to the central outlet fitting 65 as indicated in Figs. 2 and 6, it may be explained that the quantity of fines removed from the incoming flux stream (i. e. injected through the pipe 60) may be adjusted depending on the fitting to which the suction pipe 64 is connected. Bearing in mind that the air-borne stream of divided flux travels around the cylindrical wall 55 of the tank portion 53 in a circular (actually, helical) path as indicated by the arrows, the connection of the suction pipe or hose 64 to the fitting 66 (as in Fig. 8) will effect recovery of a maximum amount of fines. That is to say, the suction is then applied very close to the inlet so that the flux mass has had little or no occasion to fall in the tank and the force of suction on the fine particles is there greatest.

When the suction hose is connected to the fitting 65, as in Fig. 2, the separation of fine particles is much less, e. g. representing removal of a minimum though nevertheless significant quantity of such particles; at this central locality, the suction is essentially remote from all points of the generally downward, helical path which the flux stream is caused to follow. Finally, connection of the suction line 64 to the furthest fitting 67, i. e. adjacent the opposite side of the cylindrical tank wall 55, provides recovery of an intermediate quantity of fines, in that here the main flux stream has had opportunity to drop to a somewhat lower level in the tank, thus diminishing the particle-withdrawing effect of the air flow into the opening of the suction pipe 64.

It may be noted, in passing, that for the controlled removal of flux particles, the further instrumentalities of suction application embodied at 92 in Fig. 3 are of special significance. But for the separation into the tank portion 96 of the fine flux particles, their abrasive effect would very rapidly damage the vacuum pump 104. Furthermore the collection and removal of the fines in the tank 92 permits their examination and analysis from time to time, i. e. to afford basis for adjustment of the quantity of fines removal (through the means described above) as may be necessary to afford best welding conditions with optimum economy of flux.

Figs. 10 and 11 illustrate alternative means that will similarly afford adjustment of the quantity of fine flux particles removed. Here instead of (or in addition to) the provision of a plurality of suction outlet fittings, there is provided a curved baffle 115 extending across the upper part of the tank 53 and adjustably mounted, e. g. as being hinged or pivoted at 116 so as to be shiftable from a locality 115a of conforming engagement with the cylindrical wall 55, to a central position such as shown at 115b, the baffle being advantageously faced with rubber as indicated at 117. The suction pipe 64 is conveniently connected to the outlet fitting 65 at the center of the tank cover 54. Means for adjusting the baffle 115 from a region outside the tank are preferably included, here represented in simplified form by the rod 118 projecting from the rear face of the baffle, and sliding through an appropriately packed opening at 119 in the tank wall.

It will now be seen that in the device of Figs. 10 and 11, the quantity of fines removed through the pipe 64 is adjusted from maximum to minimum by shifting the baffle from the position 115b to the position 115a, intermediate amounts of fine particles being separated with the baffle at intermediate positions, such as indicated in solid lines. That is to say, when the baffle is at the position 115b, it directs the incoming flux stream immediately adjacent the opening 65 and the largest amount of fines is withdrawn. Displacement of the baffle to successively more remote positions reduces the effective fines-withdrawing force of the air stream entering the fitting 65, the path of the circularly traveling flux being then progressively more remote from the suction opening. It will be understood that the height of the baffle is preferably limited, e. g. as indicated in Fig. 11, so that by the time the main body of flux stream has completed one revolution of the tank wall 55, it may then, at least in considerable measure, pass below the baffle as represented by the arrow 120. By virtue of the structure indicated in Fig. 6 or alternatively the structure of Figs. 10 and 11, adjustment of the quantity of continuously withdrawn fines may be effected, thus to suit the conditions of welding operation and achieve the best economy, i. e. least possible removal of fines, that is consistent with satisfactory welding.

This application is a continuation-in-part of my copending application Serial No. 115,722, filed September 14, 1949, now abandoned.

It is to be understood that the invention is not limited to the specific apparatus herein shown and described but may be embodied in other forms without departure from its spirit.

I claim:

1. In a flux supply system for welding apparatus wherein flux material is to be supplied to the work along the path for welding, in combination, an upright tank to hold a supply of flux material, means extending from a bottom locality of the tank, for discharging flux material to the work at said path, conduit means communicating with the tank at an upper locality and adapted to extend to the work at a region of said path beyond the welding operation, a suction tank having means for applying suction thereto, conduit structure extending from said suction tank to the first-mentioned tank at a point near the second-mentioned locality of the latter, for transmitting suction to the conduit means and thereby effecting withdrawal of excess flux material from the work and discharge of same into the first-mentioned tank, and foraminous partitioning means in the suction tank extending between the suction-applying means and the said conduit structure to a locality in the suction tank remote from both said suction-applying means and conduit structure, so that any flux material transferred to said suction tank is inhibited from traveling into the suction-applying means, said tank being vertically cylindrical at its upper part, said conduit means for withdrawing excess flux material from the work being disposed to open substantially tangentially into said cylindrical part of the tank and said conduit structure from the suction tank opening into the top of said cylindrical part of the first tank at a point spaced inwardly from the cylindrical contour of said first tank, said conduit means and conduit structure being thereby cooperatively disposed so that the flux material discharged into the cylindrical tank part whirls around inside the latter allowing larger particles of the material to settle in the tank while fine particles of said material are carried into the conduit structure for collection in the suction tank.

2. The apparatus of claim 1, wherein the suction tank is a vertically extending tank adapted for collection of flux material in the bottom thereof, the suction-applying means including a suction conduit opening into the tank at an upper region spaced from the central axis of the tank, the aforesaid conduit structure opening into said suction tank at a central locality of its upper part, and the foraminous partition comprising a tubular foraminous wall structure closed at its upper end around the opening of said conduit structure in the tank and extending downward therefrom to open at a locality remote from the said conduit structure and the suction conduit, for discharge of flux material into the aforesaid bottom of the suction tank.

3. The apparatus described in claim 2, wherein the tubular foraminous structure comprises a conically shaped, perforate, rigid support flaring downwardly from said opening of the conduit structure, and a layer of porous fabric surrounding said conical support and carried thereon.

4. The apparatus described in claim 2, wherein the lower part of the suction tank comprises a vessel removably fastened to the upper part, so that collected flux material may be removed from time to time upon removal of said vessel.

5. In a flux supply system for welding apparatus wherein flux material is to be supplied to the work along the path for welding, in combination, a vertically extending tank, a screen transversely partitioning said tank at a central region thereof, said tank being adapted to hold a supply of flux material below said screen and said screen being adapted to retain solid pieces of more than a predetermined useful size, discharge conduit means opening into the lower part of the tank and adapted to extend to the work at said path, for advance of flux material to the work, means to maintain a vacuum in said tank including a suction line communicating with the upper part of said tank at a region remotely spaced above said screen, and conduit means communicating with the upper part of the tank and adapted to extend to the work at a locality of said path beyond the welding operation, said vacuum maintaining means and said conduit means cooperating to return excess flux material to the tank by suction, a feed opening structure at a side of the tank, and a removably attached cover for said feed opening structure, said feed opening structure being disposed adjacent and above the aforesaid screen and in position for access thereto when said cover is removed, said feed opening also being located substantially below said suction line and said conduit means, so that said suction does not affect the feeding of fresh flux material through said feed opening.

6. In a flux supply system for welding apparatus wherein flux material is to be supplied to the work along the path for welding, in combination, a vertical tank, a screen transversely partitioning said tank at a central locality thereof, said tank being adapted to hold a supply of flux material below said screen and said screen being adapted to retain solid pieces larger than a predetermined useful size, a discharge conduit opening from the bottom of said tank and adapted to extend to the work at said path for gravity discharge of flux material, means including conduit means adapted to extend to the work at a locality of said path beyond the welding operation, and including suction means, for withdrawing excess flux from the work by suction and returning same into the tank above said screen, said tank having a vertical extent between said screen and said discharge conduit providing sufficient head of the contained supply of flux for the aforesaid gravity discharge without impediment by the upward force of suction communicated to the tank above the screen, the upper portion of said tank above the screen comprising a cylindrical structure on a vertical axis, having a cylindrical wall and a top, said flux-withdrawing conduit means opening into the tank substantially tangentially through said cylindrical wall and said suction means comprising a suction conduit opening into the said top at a locality spaced from the wall so that the finest particles of flux material travel into said suction conduit while all other particles of flux material fall downwardly in the tank toward the screen, and said suction means also comprising a suction tank, said suction conduit extending to suction tank at a predetermined locality thereof, means opening into said suction tank at another locality for applying suction thereto, and foraminous partitioning means extending between said suction conduit and the opening of said suction-applying means to a remote locality within the suction tank, for inhibiting travel of the aforesaid finest flux material into the suction applying means, said last-mentioned suction conduit transmitting suction from the suction tank to the upper part of the first-mentioned tank, for effectuating the aforesaid withdrawal of excess flux through the flux-withdrawing conduit means and into the first-mentioned tank, and said suction tank including means for collecting said finest flux material.

7. Apparatus for classifying according to size solid particles carried by a stream of gaseous fluid, comprising a vertically extending separating chamber having a circular cross-section, fluid inlet conduit means opening into said chamber adjacent the top thereof and extending in a horizontal direction and substantially tangential with respect to the periphery of said chamber, means for directing through said conduit means into said chamber a gaseous fluid stream carrying entrained solid particles of mixed sizes, said particles tending to move along a generally helical downward path in said chamber under the combined influences of gravity and of their inertia, an outlet for larger size particles at the bottom of the chamber, an outlet in the top of said chamber, means for applying suction to said top outlet to withdraw therefrom a fluid stream with entrained smaller size particles, and means settable to vary the horizontal spacing between said helical path and said top outlet and thereby effective to vary the maximum size of particles withdrawn through said top outlet.

8. Apparatus for classifying solid particles as defined in claim 7, in which said settable means comprises a plurality of fittings in the top of said chamber and spaced at different distances from the end of said conduit means, said top outlet being connectable selectively to any of said fittings to establish selectively said maximum particle size and plug means to close the vents to which such top outlet is not connected.

9. Apparatus for classifying solid particles as defined in claim 7, in which said settable means comprises a baffle plate mounted within said chamber adjacent one side of said helical downward path, and movable means connected to said baffle plate to vary the position thereof and thereby to vary the contour of said helical downward path and its spacing from said top outlet.

10. Apparatus for separating entrained particles from a stream of gaseous fluid, comprising a vertically extending settling tank having a generally circular cross-section, a vertically extending inlet conduit opening downwardly into the upper end of said tank and substantially centrally thereof, an outlet conduit opening upwardly from the upper end of the tank adjacent one side thereof, and a downwardly divergent foraminous filter shield encircling said inlet conduit and extending downwardly therefrom toward the bottom of said tank, said shield being open at its lower end and effective to direct said entrained particles to the bottom of the tank while permitting the entraining fluid to pass through toward said outlet.

11. Apparatus as defined in claim 10, in which said tank has a bottom section removable for disposition of the particles collected therein.

References Cited in the file of this patent
UNITED STATES PATENTS

| Number | Name | Date |
|---|---|---|
| 819,171 | Robinson | May 1, 1906 |
| 840,301 | Cook | Jan. 1, 1907 |
| 1,149,463 | Pardee | Aug. 10, 1915 |
| 1,624,518 | Stebbins | Apr. 12, 1927 |
| 1,659,088 | Dowdall | Feb. 14, 1928 |
| 2,051,567 | McGee | Aug. 18, 1936 |
| 2,390,560 | Stanley | Dec. 11, 1945 |
| 2,477,935 | Miller | Aug. 2, 1949 |